United States Patent
Dreibelbis et al.

(10) Patent No.: US 10,394,982 B2
(45) Date of Patent: Aug. 27, 2019

(54) PARTIAL PARAMETERS AND PROJECTION THEREOF INCLUDED WITHIN STATISTICAL TIMING ANALYSIS

(71) Applicant: INTERNATIONAL BUSINESS MACHINES CORPORATION, Armonk, NY (US)

(72) Inventors: Brian M. Dreibelbis, Underhill, VT (US); John P. Dubuque, Jericho, VT (US); Eric A. Foreman, Fairfax, VT (US); Jeffrey G. Hemmett, St George, VT (US); Lansing D. Pickup, Raleigh, NC (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1113 days.

(21) Appl. No.: 14/190,646

(22) Filed: Feb. 26, 2014

(65) Prior Publication Data
US 2015/0242554 A1   Aug. 27, 2015

(51) Int. Cl.
*G06F 17/50* (2006.01)
(52) U.S. Cl.
CPC ...... *G06F 17/5031* (2013.01); *G06F 2217/84* (2013.01)
(58) Field of Classification Search
None
See application file for complete search history.

(56) References Cited

U.S. PATENT DOCUMENTS

| 8,141,012 B2 | 3/2012 | Buck et al. |
| 8,176,454 B2 | 5/2012 | Potkonjak |

(Continued)

OTHER PUBLICATIONS

Zolotov, Vladimir, et al. "Timing analysis with nonseparable statistical and deterministic variations." Proceedings of the 49th Annual Design Automation Conference. ACM, Jun. 2012.*

(Continued)

*Primary Examiner* — Bijan Mapar
(74) *Attorney, Agent, or Firm* — Steven J. Meyers; Andrew M. Calderon; Roberts Mlotkowski Safran Cole & Calderon, P.C.

(57) ABSTRACT

Systems and methods for improving timing closure of new and existing IC chips by breaking at least one parameter of interest into two or more partial parameters. More specifically, a method is provided for that includes propagating at least one timing analysis run for a semiconductor product. The method further includes identifying at least one parameter of interest used in the at least one timing analysis run. The method further includes splitting the at least one parameter into two parts comprising a controlled part and an uncontrolled part. The method further includes correlating or anti-correlating the controlled part with another parameter used in the at least one timing analysis run. The method further includes projecting timing using the correlation or anti-correlation between the controlled part and the another parameter and using the uncontrolled part of the at least one parameter.

18 Claims, 8 Drawing Sheets

(56) References Cited

U.S. PATENT DOCUMENTS

| | | |
|---|---|---|
| 8,245,167 B1 | 8/2012 | Silva et al. |
| 2008/0034337 A1 | 2/2008 | Kuemerle et al. |
| 2011/0106497 A1 | 5/2011 | Visweswariah et al. |
| 2012/0117527 A1 | 5/2012 | Hemmett et al. |
| 2013/0031523 A1 | 1/2013 | Foreman et al. |
| 2013/0036395 A1 | 2/2013 | Foreman et al. |
| 2017/0089974 A1* | 3/2017 | Pu .................. G01R 31/2851 |

OTHER PUBLICATIONS

Mahfuzul, Islam AKM, and Hidetoshi Onodera. "On-chip detection of process shift and process spread for silicon debugging and model-hardware correlation." Test Symposium (ATS), 2012 IEEE 21st Asian. IEEE, 2012.*

Aseem Agarwal et al., "Circuit Optimization using Statistical Static Timing Analysis", 2005, 4 pages.

Hongliang Chang et al., "Statistical Timing Analysis Considering Spatial Correlations Using a Single Pert-Like Traversal", 2003, 5 pages.

Abbaspour et al., "Efficient Variation Interconnect Modeling for Statistical Timing Analysis by Combined Sensitivity Analysis and Model-Order Reduction" Jan. 2007, 6 pages.

Davoodi et al., "Robust Estimation of Timing Yield with Partial Statistical Information on Process Variations", TCAD vol. 27, No. 12, Dec. 2008, 2 pp.

Wei-Shen Wang, B.S., "Models and Algorithms for Statistical Timing and Power Analysis of Digital Integrated Circuits", The University of Texas at Austin May 2007, 140 pages.

* cited by examiner

PARTIAL PARAMETERS AND PROJECTION THEREOF INCLUDED WITHIN STATISTICAL TIMING ANALYSIS

FIELD OF THE INVENTION

The invention relates to systems and methods for integrated circuit ("IC") chip fabrication and optimization and, more particularly, to systems and methods for improving timing closure of new and existing IC chips by breaking at least one parameter of interest into two or more partial parameters.

BACKGROUND

The layout of an IC must not only satisfy geometric requirements, e.g., non-overlapping cells and routability, but also meet the design's timing constraints, e.g., setup (long-path) and hold (short-path) constraints. The optimization process that meets these requirements and constraints is often called timing closure. Static timing analysis (STA) is a method of computing the expected timing of a digital circuit without requiring simulation in order to perform timing closure. STA has been a typical analysis algorithm for the design of IC chips over the last 30 years. However, in recent years the increased variation in semiconductor devices and interconnect has introduced a number of issues that cannot be handled by traditional (deterministic) STA. This has led to considerable research into statistical static timing analysis (SSTA), which replaces the normal deterministic timing of gates and interconnects with probability distributions, and gives a distribution of possible circuit outcomes rather than a single outcome.

Statistical static timing analysis (SSTA) may be performed for final timing closure or timing signoff using a first-order linear approximation of a Taylor series, referred to as a canonical model. However, if a range for a parameter (e.g., voltage) of the canonical model increases, then non-linearity or second order error may be introduced into the canonical model. Moreover, at least two unique timing runs (e.g., SSTA) are typically required and each of the timing runs should assert a perfect correlation between at least two parameters in order to provide timing within a process subspace.

SSTA may also be performed for final timing closure or timing signoff using an nth-order extension (e.g., a second-order extension) of the aforementioned first-order linear approximation. More specifically, nth order cross terms (e.g., second order cross terms) for at least two parameters may be incorporated into the first order approximation of the Taylor series, referred to as an extended canonical model. This timing closure typically only requires a single timing run (e.g., SSTA) because it includes the cross terms to span the extended parameter range. However, this form of timing closure typically reduces coverage to a significantly reduced process subspace.

SUMMARY

In a first aspect of the invention, a method is provided for that is implemented in a computer infrastructure having computer executable code tangibly embodied on a computer readable storage medium having programming instructions operable to propagate at least one timing analysis run for a semiconductor product. The programming instructions are further operable to identify at least one parameter of interest used in the at least one timing analysis run. The programming instructions are further operable to split the at least one parameter into two parts comprising a controlled part and an uncontrolled part. The programming instructions are further operable to correlate or anti-correlate the controlled part with another parameter used in the at least one timing analysis run. The programming instructions are further operable to project timing using the correlation or anti-correlation between the controlled part and the another parameter and using the uncontrolled part of the at least one parameter.

In another aspect of the invention, a method is provided for that includes identifying at least two parameters of interest used in at least one timing analysis run of a semiconductor product. The method further includes splitting at least one parameter of the two parameter of interest into two parts comprising a controlled part and an uncontrolled part. The method further includes correlating or anti-correlating the controlled part with another parameter of the two parameters for each delay or slew calculated in the at least one timing analysis. The method further includes computing arrival times, required arrival times, and slack in the at least one timing analysis using the correlation or anti-correlation between the controlled part and the another parameter and using the uncontrolled part of the at least one parameter.

In yet another aspect of the invention, a computer program product comprising a computer readable storage medium having program instructions embodied therewith, the program instructions executable by at least one processor to cause the at least one processor to propagate at least one timing analysis run for a semiconductor product. The at least one processor also being caused to identify at least one parameter of interest used in the at least one timing analysis run. The at least one processor also being caused to split the at least one parameter into two parts comprising a controlled part and an uncontrolled part. The at least one processor also being caused to correlate or anti-correlate the controlled part with another parameter used in the at least one timing analysis run. The at least one processor also being caused to project timing using the correlation or anti-correlation between the controlled part and the another parameter and using the uncontrolled part of the at least one parameter.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates to systems and methods for integrated circuit ("IC") chip fabrication and optimization and, more particularly, to systems and methods for improving timing closure of new and existing IC chips by breaking at least one parameter of interest into two or more partial parameters. More specifically, implementations of the invention provide systems and methods for running SSTA, breaking at least one parameter into multiple pieces, correlating or anti-correlating at least one of the multiple pieces with at least one other parameter, and projecting a final timing result using the correlated or anti-correlated at least one piece and the at least one other parameter. In embodiments, the projecting the final timing result may include taking a root sum of squares (RSS) of the at least one other parameter. Advantageously, aspects of the present invention provide solutions for existing timing methodology where partial parameters are needed for improved modeling of variability and its effect on other parameters. More advantageously, aspects of the present invention provide for one or more timing runs that are capable of being projected to a larger process subspace than was previously achievable in conventional extended canonical modeling techniques.

In accordance with aspects of the invention, the inventive system and method of SSTA may have an exemplary use in integrated circuit manufacturing. For example, the system and method of SSTA may be used for selective voltage binning (SVB) or adaptive voltage scaling (AVS) during integrated circuit manufacturing. However, those of ordinary skill in the art should understand that the use of the system and method of SSTA for SVB is merely illustrative of one exemplary use and that other uses for the system and method of SSTA are contemplated by the invention, all of which do not depart from the scope and spirit of the invention.

SVB is a performance screen ring oscillator (PSRO)-based screening process of high performance chips into process or voltage bins. SVB takes into consideration that chip performance and chip leakage depend on supply voltage of the chip, and that dependency can be used to convert slow or leaky chips into acceptable chips by tweaking the supply voltage. In SVB, the manufactured chips are tested using oscillator rings for an average frequency of the chip. Bins are assigned a range of frequencies or a supply voltage necessary for compensating for the slow or fast frequencies, and the tested chips are placed into corresponding bins. The supply voltage of each chip in the corresponding bins may be adjusted using a voltage regulator to compensate for process effect to chip performance and leakage. For example, the supply voltage may be increased when the process parameter moves to the slow process space.

Figure 1:
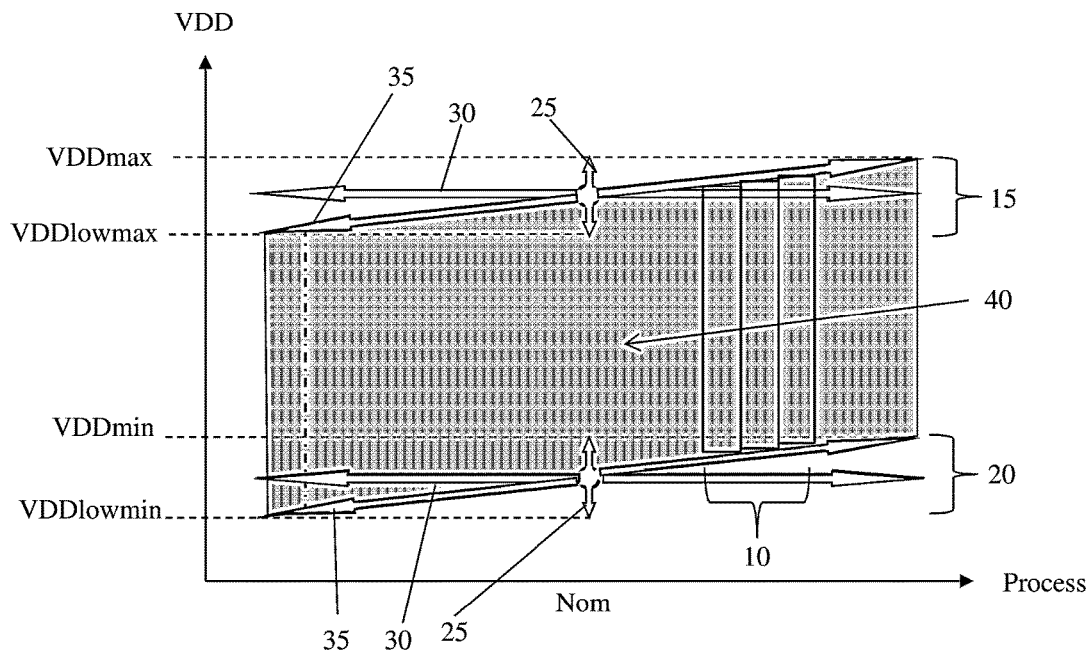
FIGS. 1 and 2 illustrate methods for performing selective voltage binning and timing closure.

FIG. 1 illustrates a conventional method for performing SVB and timing closure using a canonical model or a first order delay model. The x-axis represents a first parameter (e.g., process) from fast to slow and the y-axis represents a second parameter (e.g., supply voltage) from low to high. Vddmax to Vddlow min is the complete operating range at which the chip will be operated within and in which timing will be closed. In other words, at the fastest side of the process space there are chips that operate from Vddlowmax down to Vddlowmin, and at the slowest side of the process space there are chips that operate from Vddmax down to Vddmin. As can be seen, each bin of a binning (e.g., SVB) scheme would be represented by a number of vertical rectangles 10 that step up through the process space. Therefore, each chip always has low voltage and high voltage but the range of the voltage for the chips changes as process changes from the fast side to the slow side, which is part of the power saving provided by the binning scheme. To model this variation in voltage ranges across the process space during timing closure, this method of timing closure uses two timing runs or two runs of SSTA. The first SSTA 15 is performed at the higher voltage range between Vddmax and Vddlowmax and the second SSTA 20 is performed at the lower voltage range between Vddmin and Vddlowmin. In both SSTA 15 and 20, the first parameter (e.g., voltage) is treated as a statistical source of variation 25 and the second parameter (e.g., process) is treated as a statistical source of variation 30, and these two statistical sources of variation are correlated or anti-correlated. This treatment of the two parameters, and the correlation or anti-correlation thereof, models delay values along oblique lines 35 for SSTA 15 and 20 respectively. Accordingly, all parameter values between the oblique lines 35 within the process space 40 are accounted for in the timing closure.

However, if the range of parameters for the SSTA 15 and 20 increase, then non-linearity or second order error may be added to the delay models, which causes problems in the timing closure. Additionally, this method requires the use of two timing runs (e.g., SSTA 15 and 20), which increase cost and complexity to the IC design and fabrication.

Figure 2:
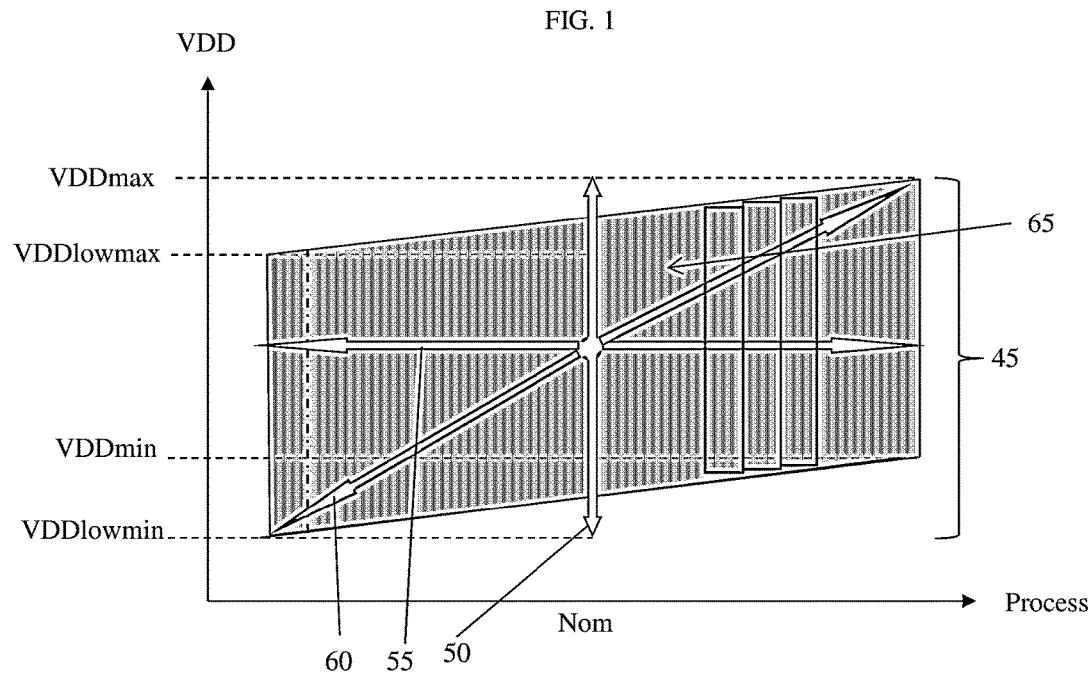

FIG. 2 illustrates an alternative conventional method for performing SVB and timing closure using an extended canonical model or second order delay model. The x-axis represents a first parameter (e.g., process) from fast to slow and the y-axis represents a second parameter (e.g., supply voltage) from low to high. Vddmax to Vddlow min is the complete operating range at which the chip will be operated within and in which timing will be closed. To model the variation in the voltage ranges across the process space during timing closure, this method of timing closure uses only one timing run or one run of SSTA to mitigate an increase in cost and complexity to the IC design and fabrication. The SSTA 45 is performed though the full operating voltage range between Vddmax and the Vddlowmin. In SSTA 45, the first parameter (e.g., voltage) is treated as a statistical source of variation 50, the second parameter (e.g., process) is treated as a statistical source of variation 55, these two statistical sources of variation are correlated or anti-correlated, and parameter cross terms (e.g., second order terms) are used to span the increased voltage range. This treatment of the two parameters, the correlation or anti-correlation thereof, and the addition of parameter cross terms, model delay values along oblique line 60 for SSTA 45. Accordingly, all parameter values are collapsed to the oblique line 60 (i.e., a reduced process subspace).

However, anything within the process space 65 is unaccounted for in the timing closure illustrated in FIG. 2. The embodiments described below address this issue and are able to provide for one or more statistical timing runs that cover the full range of parameters. More specifically, implementations of the present invention provide for systems and methods that account for the process space 65 using oblique projection or partial parameter projection in the presence of an extended canonical model or an nth order model (e.g., a second order model), which allows for the completion of timing closure using one or more SSTA runs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
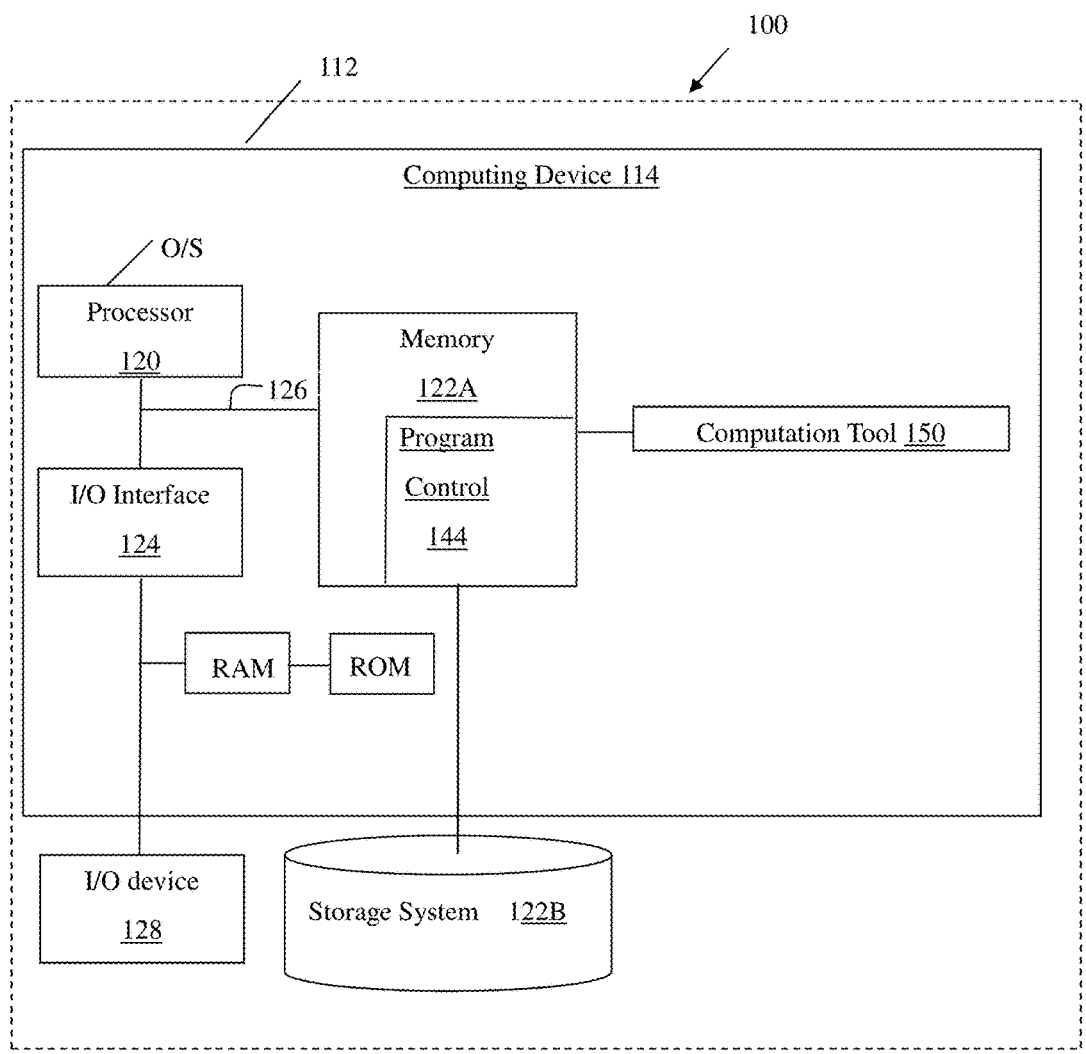
FIG. 3 is an illustrative external environment for implementing the invention in accordance with aspects of the invention.

With reference now to FIG. 3, an illustrative environment 100 is provided for managing the processes in accordance with the present invention. To this extent, the environment 100 includes a server or other computing system 112 that can perform the processes described herein. In particular, the server 112 includes a computing device 114. The computing device 114 can be resident on a network infrastructure or computing device of a third party service provider (any of which is generally represented in FIG. 3).

The computing device 114 also includes a processor 120 (e.g., CPU), memory 122A, an I/O interface 124, and a bus 126. The memory 122A can include local memory employed during actual execution of program code, bulk storage, and cache memories which provide temporary storage of at least some program code in order to reduce the number of times code must be retrieved from bulk storage during execution.

In addition, the computing device includes random access memory (RAM), a read-only memory (ROM), and an operating system (O/S).

The computing device 114 is in communication with the external I/O device/resource 128 and the storage system 122B. For example, the I/O device 128 can comprise any device that enables an individual to interact with the computing device 114 (e.g., user interface) or any device that enables the computing device 114 to communicate with one or more other computing devices using any type of communications link. The external I/O device/resource 128 may be for example, a handheld device, PDA, handset, keyboard etc.

In general, the processor 120 executes computer program code (e.g., program control 144), which can be stored in the memory 122A and/or storage system 122B. Moreover, in accordance with aspects of the invention, the program control 144 controls a computation tool 150, e.g., at least a portion of an electronic design automation (EDA) application or tool, which performs the processes described herein. The computation tool 150 can be implemented as one or more program code in the program control 144 stored in memory 122A as separate or combined modules. Additionally, the computation tool 150 may be implemented as separate dedicated processors or a single or several processors to provide the function of these tools.

While executing the computer program code, the processor 120 can read and/or write data to/from memory 122A, storage system 122B, and/or I/O interface 124. The program code executes the processes of the invention. The bus 126 provides a communications link between each of the components in the computing device 114.

The computing device 114 can comprise any general purpose computing article of manufacture capable of executing computer program code installed thereon (e.g., a personal computer, server, etc.). However, it is understood that the computing device 114 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 112 is only illustrative of various types of computer infrastructures for implementing the invention. For example, in embodiments, server 112 comprises two or more computing devices (e.g., a server cluster) that communicate over any type of communications link, such as a network, a shared memory, or the like, to perform the process described herein. Further, while performing the processes described herein, one or more computing devices on server 112 can communicate with one or more other computing devices external to server 112 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 4:
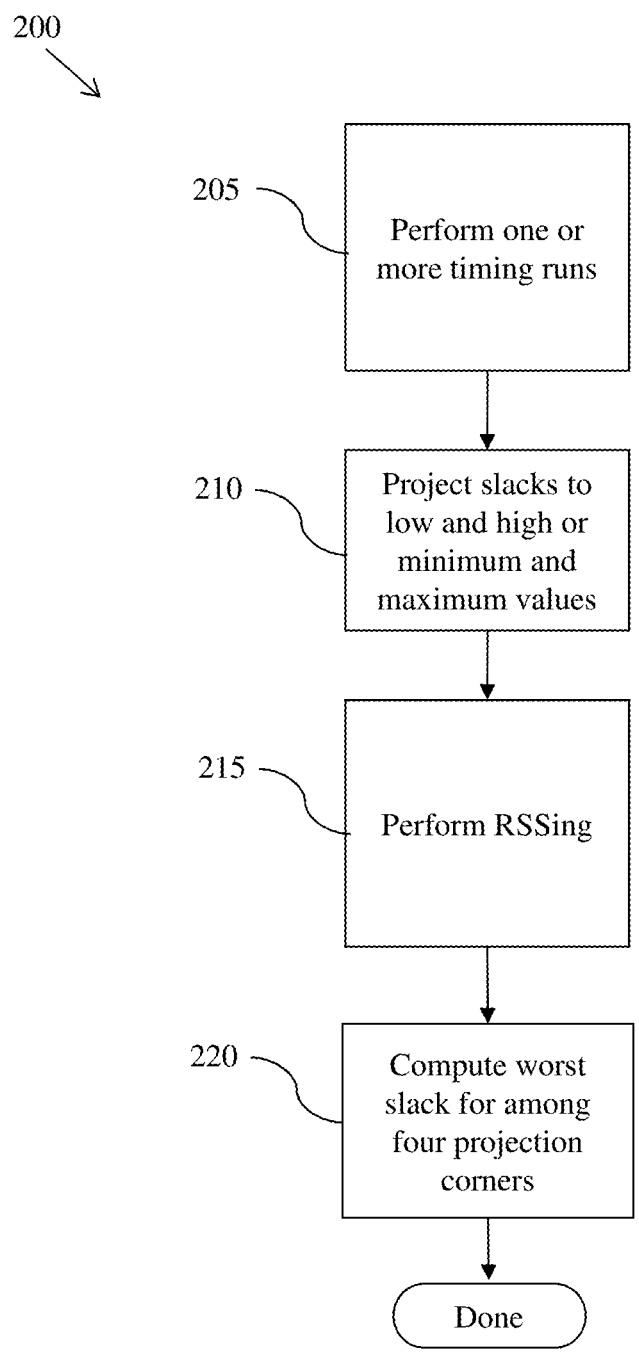
FIGS. 4-6 are illustrative process flows for implementing the system in accordance with aspects of the invention.

FIG. 4 shows an exemplary flow for performing aspects of the present invention. The steps of FIG. 4 may be implemented in the environment of FIG. 3, for example. As noted above, the flowchart(s) illustrate the architecture, functionality, and operation of possible implementations of systems, methods, and computer program products according to various embodiments of the present invention. In embodiments, a process 200 is provided for modeling parameter effect(s) on other sources of variation.

At step 205, one or more timing runs (e.g., a single SSTA analysis) may be run or propagated. In embodiments, the one or more timing runs may be implemented to cover a full range of parameter variations across a process subspace. For example, in SSTA, timing quantities are propagated as statistical distributions. The propagated timing quantities may include arrival times (AT), required arrival times (RAT), and slews, along with other timing related quantities such as guard times, adjusts, asserts, etc. SSTA operates on a timing graph comprised of points at which signal transitions can occur, which may be referred to as timing points or nodes, and edges that connect incident nodes. Timing values are computed for the timing graph at each node based upon arrival times (ATs), which define the time (or time distribution) at which a given signal arrives at a timing point, and required arrival times (RATs), which define the time (or time distribution) at which the signal is required to get to the timing point, in order to meet the timing requirements. These ATs and RATs are used to compute slacks at nodes (RAT minus AT for late mode and AT minus RAT for early mode). A negative slack for either a late mode test slack or an early mode slack indicates a timing constraint violation.

At step 210, the computed timing quantities (e.g., AT, RAT, slew, and/or slack) may be projected to low and high or maximum and minimum values of a range for at least one parameter. In embodiments, projection to the low or minimum values of the range may be performed by splitting the at least one parameter into two or more parts or pieces. For example, the two or more pieces may comprise a controlled piece that is treated as correlated with at least one other parameter and an uncontrolled piece that is treated as independent or its own separate variable. In embodiments, the projection to the low or minimum values of the range may further comprise correlating the controlled piece to the at least one other parameter.

In embodiments, projection to the high or maximum values of the range may include identifying the parameter space shape of the projected process space (e.g., a parallelogram or a trapezoid). For example, when the parameter space shape of the projected process space is a parallelogram region (e.g., the process space 65 shown in FIG. 2), the projection to the high or maximum values of the range may include a process similar to the projection to the low or minimum values of the range (e.g., breaking the at least one parameter into two or more parts or pieces). When the parameter space shape of the projected process space is a trapezoid region, the projection to the high or maximum values of the range may include setting a high parameter value.

Once the projection to the low or minimum and high or maximum values of the range are performed, canonical models may be obtained as should be understood by those of ordinary skill in the art. For example, provided below is an exemplary formulaic technique for projecting timing quantities (e.g., AT, RAT, slew, and/or slack) to the low or minimum and high or maximum values and obtaining canonical models. The below techniques use voltage and process in an anti-correlated relationship as the parameters for input into the formulas. However, it should be understood that the systems and processes of the present invention may include the use of any parameters in any correlated or anti-correlated relationship used in SSTA without departing from the spirit and scope of the present invention.

In embodiments, the above described projection to the low or minimum and the high or maximum values of the range may include a transformation by partial anti-tracking between $\Delta V$ (change in voltage) and $\Delta P$ (change in process) over a process subspace. The transformation may include splitting at least one of the parameters (e.g., voltage) into a controlled piece and an uncontrolled piece, where the controlled piece is anti-correlated with the other parameter (e.g., process) as shown in formula (1).

$$\Delta V = \Delta V_C + \Delta V_{NC} \quad (1)$$

where:
$\Delta V$=change in voltage;
$\Delta V_C$=controlled piece of voltage;
$\Delta V_{NC}$=uncontrolled piece of voltage; and
$\Delta V_C$ anti-tracks with P (process).

In embodiments, the above described projection to the low or minimum and the high or maximum values of the range may further include a canonical form transformation as shown in formulas (2)-(4).

$$a_0 + a_V \Delta V + a_X \Delta X + a_P \Delta P + a_{XV} \Delta V \Delta X + a_{PV} \Delta V \Delta P + a_{RV} \Delta V \Delta R \quad (2)$$

where:
$a_0$=mean time;
$a_V \Delta V$=sensitivity to the voltage parameter of the correlated set;
$a_X \Delta X$=sensitivity to variable X;
$a_P \Delta P$=sensitivity to the process parameter of the correlated set;
$a_{XV} \Delta V \Delta$=voltage parameter and variable X second order cross term;
$a_{PV} \Delta V \Delta P$=voltage parameter and process parameter second order cross term; and
$a_{RV} \Delta V \Delta R$=voltage parameter and random variable second order cross term.

$$a_0 + a_{VC} \Delta V_C + a_{VNC} \Delta V_{NC} + a_X \Delta X + a_P \Delta P + a_{XV} \Delta V \Delta X + a_{PV} \Delta V \Delta P + a_{RV} \Delta V \Delta R \quad (3)$$

where:
$\Delta V$ is split into $\Delta V_C + \Delta V_{NC}$;
$a_{VC} \Delta V_C$=sensitivity to the controlled piece of voltage; and
$a_{VNC} \Delta V_{NC}$=sensitivity to the uncontrolled piece of voltage.

$$a_0 + a_{VNC} \Delta V_{NC} + a_X \Delta X + (a_P - a_{VC}) \Delta P + a_{XV} \Delta V \Delta X + a_{PV} \Delta V \Delta P + a_{RV} \Delta V \Delta R \quad (4)$$

where: the controlled piece of voltage ($\Delta V_C$) is anti-correlated to process such that $\Delta V_C = -\Delta P$.

In embodiments, the above described projection to the low or minimum and the high or maximum values of the range may further include projection to corners of the process space as shown in formulas (5)-(7).

Corner 1: $\Delta V = V_{lowmin}, \Delta V_{NC} = V_{min}$ and Corner 2:
$$\Delta V = V_{min}, \Delta V_{NC} = V_{min} \quad (5)$$

where: $V_{lowmin}$=the lowest value of the voltage range at the fast process end; and
$V_{min}$=the lowest value of the voltage range at the slow process end.

Corner 1: $(a_0 + a_{VNC} \Delta V_{min}) + (a_{X+} a_{XV} \Delta V_{lowmin}) \Delta X + (a_P - a_{VC} + a_{PV} \Delta V_{lowmin}) \Delta P \quad (6)$ Corner 2: $(a_0 + a_{VNC} \Delta V_{min}) + (a_{X+} a_{XV} \Delta V_{min}) \Delta X + (a_P - a_{VC} + a_{PV} \Delta V_{min}) \Delta P \quad (7)$ Once the low or minimum and the high or maximum values of the range are projected to the corners of the process space, sensitivities of the process parameter may be RSSed at step 215 with other variations. However, worst projection can occur between voltage corners due to process and voltage second order cross terms. Accordingly, embodiments of the present invention provide for techniques in providing for a worst case projection and the RSSing thereof as shown in formulas (8)-(13).

Corner 1: $(a_0 + a_{VNC} \Delta V_{min}) + (a_{X+} a_{XV} \Delta V_{lowmin}) \Delta X + (a_P - a_{VC} + a_{PV} \Delta V_{lowmin}) \Delta P \quad (8)$ Corner 2: $(a_0 + a_{VNC} \Delta V_{min}) + (a_{X+} a_{XV} \Delta V_{min}) \Delta X + (a_P - a_{VC} + a_{PV} \Delta V_{min}) \Delta P \quad (9)$ Projection to voltage Corner 3 between Corner 1 and Corner 2: $(a_0 + a_{VNC} \Delta V_{min}) + (a_{X+} a_{XV} \Delta V_{min}) \Delta X + (a_P - a_{VC} + a_{PV} \Delta V_{min}) \Delta P \quad (10)$ RSSing $\Delta P$ with variables $\Delta X_i$ computes RSSed sensitivity as:

$$\sum_i (a_{X,i} + a_{XV,i} \Delta V_{worst})^2 + (a_P - a_{VC} + a_{PV} \Delta V_{worst})^2 \quad (11)$$

The minimum/maximum inside interval $\Delta V_{lowmin} \leq \Delta V_{worst} < \Delta V_{min}$ at $\Delta V_{worst}$ computed from:

$$\sum_i (a_{X,i} a_{XV,i} + a_{XV,i}^2 \Delta V_{worst}) + a_P a_{PV} - a_{VC} a_{PV} + a_{PV}^2 \Delta V_{worst} = 0 \quad (12)$$

$$\Delta V_{worst} = -\frac{\sum_i a_{X,i} a_{XV,i} + a_P a_{PV} - a_{VC} a_{PV}}{\sum_i a_{XV,i}^2 + a_{PV}^2} = \frac{a_{VC} a_{PV} - \sum_i a_{X,i} a_{XV,i} + a_P a_{PV}}{\sum_i a_{XV,i}^2 + a_{PV}^2} \quad (13)$$

The worst projection with RSSing should be selected among corners 1, 2, and 3 defined by $\Delta V_{worst}$. As should be understood, the above formulas only provide an example for projection to low voltage process corners; however, in the instance of a parallelogram process space, similar techniques may be used for projection to the high voltage process corners.

As also shown in FIG. 4, at step 220, the worst slack from among the four projected corners of the process space (e.g., the trapezoid or parallelogram region) may be computed. For example, the process may comprise computing the slack using the parameter projection at each of the four projected corners. After the four slack projections are computed, then the worst slack could be reported as the minimum slack across the four projection computations.

Although aspects of the present invention are discussed herein with respect to one pair of correlated parameters, it should be understood that any number or combination of parameters may be used without departing from the spirit and scope of the present invention. Furthermore, it should be understood that the embodiments described herein may be implemented with respect to single timing runs, multiple timing runs, SVB or any type of process binning in which there are existing problems with imperfect modeling control of a first parameter and imperfect sensing of a second parameter variation, and any other runs where partial parameters may be needed for improved modeling control. Additionally, the embodiments of the present invention may be used without prior detailed knowledge of correlations and does not require characterization.

Advantageously, embodiments of the present invention allow for the application of proposed variability models with split variables to project timing results for computing timing quantities and creating timing reports. More advantageously, aspects of the present invention may allow for higher flexibility and capability to be adapted to different binning schemes and improves runtime, memory, and accuracy by modeling deterministic variations of a first parameter and its effect on other sources of variation (e.g., a second parameter).

Figure 5:
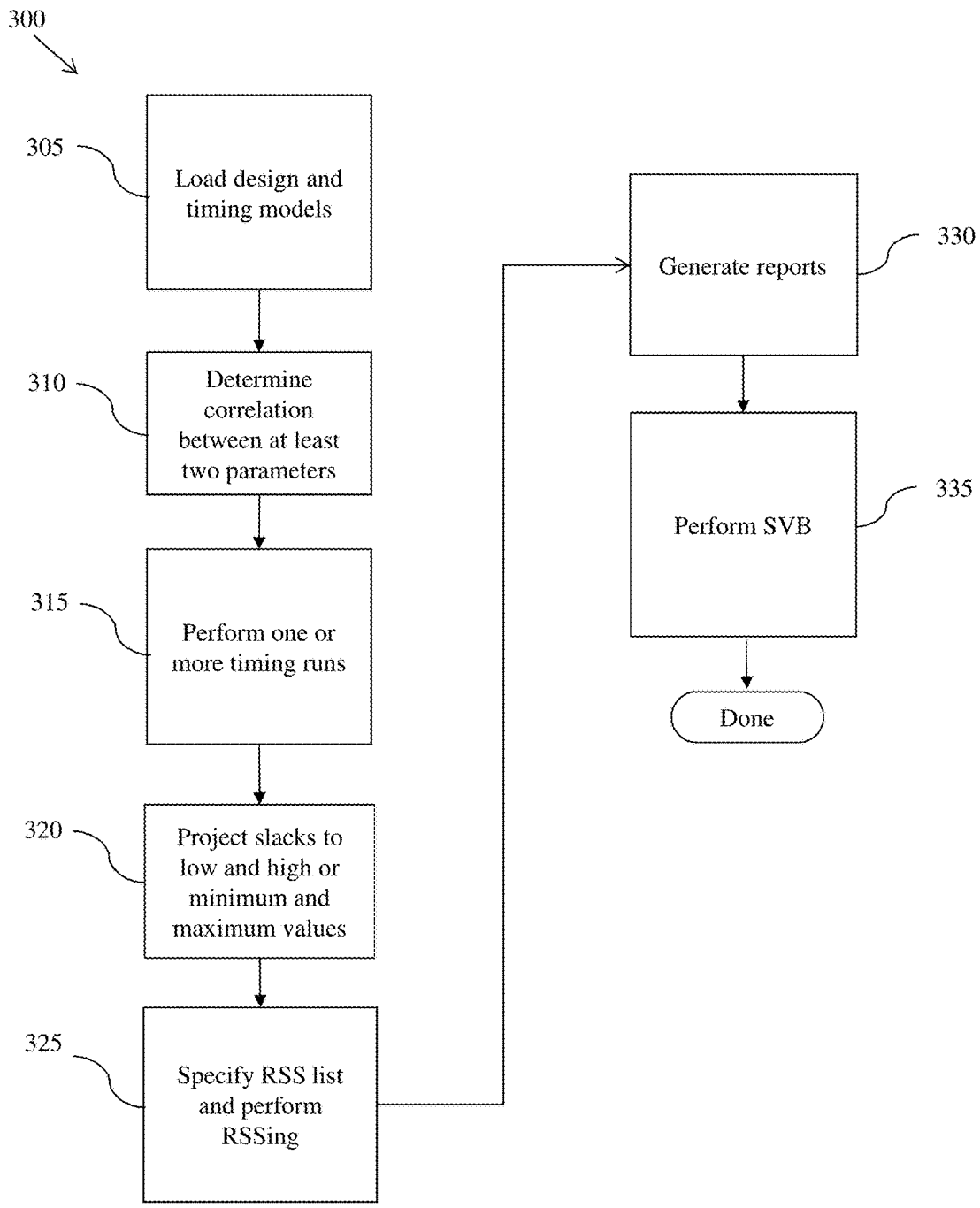

FIG. 5 depicts an exemplary flow for a process in accordance with aspects of the present invention. In embodiments, a process 300 is provided for closing timing of a semiconductor product by using parameters and partial parameters for on-chip variation (OCV) or across chip variation (ACV) and voltage (i.e., a correlated pair of parameters), and the subsequent SVB of the semiconductor product. In accordance with aspects of the invention, the system and method of SSTA process 300 for timing quantity projection may use statistical timing to model process variation of the integrated circuit or specified testing regions of the integrated circuit using the techniques described in detail with respect to FIG. 4.

At step 305, design and timing models for an integrated circuit or specified testing region of the integrated circuit may be loaded into a computing device. For example, a design structure and timing models for an integrated circuit or specified region of the integrated circuit may be loaded into computation tool 150 (as discussed with regard to FIG. 3).

At step 310, a correlation between at least two parameters may be determined or specified. For example, a user or the computation tool 150 may determine or specify a correlation or anti-correlation between at least two parameters of the integrated circuit. In embodiments, the correlation or anti-correlation may be determined by the computation tool 150 looking up correlations or anti-correlations based on the design structure. For example, the correlation or anti-correlation may be determined or specified by: (1) the physics of the devices in the design structure, (2) the manufacturing process of the design structure, or (3) the design structure architecture, such as, the implementation of voltage and temperature regulators that are designed to regulate the integrated circuit based on a defined relationship.

At step 315, at least one timing run (e.g., a single SSTA) may be performed for the design structure that propagates the correlated or anti-correlated at least two parameters into the timing analysis. For example, an SSTA for the integrated circuit may be performed that computes a statistical approximation of the circuit timing characteristics, e.g., ATs, RATs, delay, and timing slack, as functions of the same parameters. Specifically, canonical delays may be calculated and then propagated to obtain ATS, RATs, and timing slack that take into consideration the at least two parameters separately. The general calculating of the SSTA for the design structure would be known to one of ordinary skill in the art such that further explanation is not required.

At step 320, the computed timing quantities (e.g., AT, RAT, slew, and/or slack) may be projected to low and high or maximum and minimum values of a range for at least one of the parameters, as discussed in detail with respect to FIG. 4. In embodiments, projection to the low or minimum values of the range may be performed by splitting the at least one parameter into two or more parts or pieces. For example, the two or more pieces may comprise a controlled piece that is treated as correlated with at least one other parameter and an uncontrolled piece that is treated as independent or its own separate variable. In embodiments, the projection to the low or minimum values of the range may further comprise correlating the controlled piece to the at least one other parameter.

In embodiments, projection to the high or maximum values of the range may include identifying the parameter space shape of the projected process space (e.g., a parallelogram or a trapezoid). For example, when the parameter space shape of the projected process space is a parallelogram region (e.g., the process space 65 shown in FIG. 2), the projection to the high or maximum values of the range may include a process similar to the projection to the low or minimum values of the range (e.g., breaking the at least one parameter into two or more parts or pieces). When the parameter space shape of the projected process space is a trapezoid region, the projection to the high or maximum values of the range may include setting a high parameter value. Once the projection to the low or minimum and high or maximum values of the range are performed, canonical models may be obtained, as should be understood by those of ordinary skill in the art.

At step 325, an RSS list may be specified to include the parameters and parameter pieces. For example, the RSS list may be specified for statistical sources of variation or standard deviation including the parameters and parameter pieces. The RSS list provides a reduction in overall variance or standard deviation. In embodiments, the RSS list may not be specified in the instances of non-statistical sources of variation or standard deviation. The providing of an RSS list for the design structure would be known to one of ordinary skill in the art such that further explanation is not required. Once the RSS list is specified, sensitivities of the process parameter may be RSSed with other variations, as described in the techniques above with respect to FIG. 4.

At step 330, reports may be generated. For example, the computation tool 150 may generate reports comprising any timing quantity including the RATs, the ATs, the timing quantity projection, and the transition time or slew rate for the design structure obtained from the SSTA. The generated reports can then be used to place the integrated chip into the correct bin of a multi-bin SVB process at step 335.

In accordance with these aspects of the present invention, the systems and methods for closing timing of a semiconductor product by splitting parameters or variables into controlled and uncontrolled parts or pieces are hereafter discussed in detail as they pertain to additional or alternative embodiments and their exemplary use with respect to SVB. More specifically, additional or alternative implementations of the invention provide systems and methods for running SSTA that includes breaking at least one parameter into multiple pieces, correlating or anti-correlating at least one of the multiple pieces with at least one other parameter, and performing timing quantity computations with variables including the multiple pieces of parameter by running one or more timing runs (e.g., SSTA). In embodiments, the worst slack for among 4 projection corners of a process space (e.g., a trapezoid or parallelogram region) may be computed. Advantageously, aspects of the present invention provide solutions for existing timing methodology where partial parameters are needed for improved modeling of variability and its effect on other parameters. More advantageously, aspects of the present invention provide for one or more timing runs that are capable of applying proposed variability models with split variables to either computation of canonical forms of delays and slews or to projection of timing results for computing timing quantities and generating timing reports.

Figure 6:
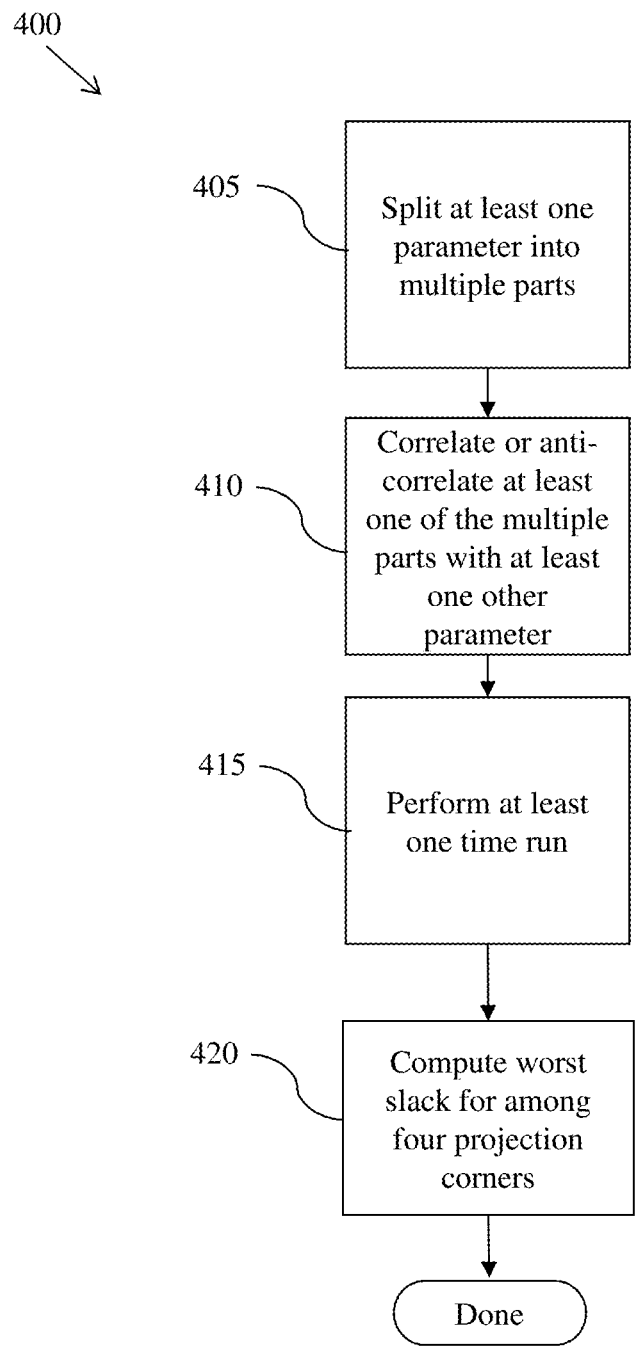

FIG. 6 depicts an exemplary flow for a process in accordance with aspects of the present invention. In embodiments, a process 400 is provided for closing timing of a semiconductor product. At step 405, at least one parameter to be used in a timing analysis may be split into two or more parts or pieces. For example, voltage may be split into a correlated or controlled piece and an uncorrelated or uncontrolled piece. Optionally, another parameter, such as process may also be split into a correlated or controlled piece and an uncorrelated or uncontrolled piece.

At step 410, the correlated or controlled piece of the at least one parameter may be correlated or anti-correlated with the another parameter. For example, the correlated or controlled piece of voltage may be anti-correlated with the process parameter or optionally the controlled portion of the process parameter, and the uncontrolled piece of voltage may be treated as independent or its own separate variable.

At step 415, at least one timing run (e.g., a single SSTA) may be performed for the design structure that propagates the correlated or anti-correlated at least two parameters into the timing analysis. For example, an SSTA for the integrated circuit may be performed that computes a statistical approximation of the circuit timing characteristics, e.g., ATs, RATs, delay, and timing slack, as functions of the same parameters. Specifically, canonical delays may be calculated and then propagated to obtain ATS, RATs, and timing slack that take into consideration the at least two parameters separately. The general calculating of the SSTA for the design structure would be known to one of ordinary skill in the art such that further explanation is not required.

For example, provided below is an exemplary formulaic technique for splitting variables or parameters and performing SSTA using the split variable or parameters. The below techniques use voltage and process in an anti-correlated relationship as the parameters for input into the formulas. However, it should be understood that the systems and processes of the present invention may include the use of any parameters in any correlated or anti-correlated relationship used in SSTA without departing from the spirit and scope of the present invention In embodiments, the above described SSTA may include a transformation by partial anti-tracking between $\Delta V$ (change in voltage) and $\Delta P$ (change in process) over a process subspace. The transformation may include splitting at least one of the parameters (e.g., voltage) into a controlled piece (e.g., a deterministic piece) and an uncontrolled piece (e.g., a statistical variable) as shown in formula (14).

$$\Delta V = \Delta V_C + \Delta V_{NC} \quad (14)$$

where:
 $\Delta V$=change in voltage;
 $\Delta V_C$=controlled piece of voltage; and
 $\Delta V_{NC}$=uncontrolled piece of voltage.

In embodiments, the above transformation may optionally include splitting at least one other parameter (e.g., process) into a controlled piece (e.g., a deterministic piece) and an uncontrolled piece (e.g., a statistical variable) as shown in formula (15).

$$\Delta P = \Delta P_C + \Delta P_{NC} \quad (15)$$

where:
 $\Delta P$=change in process;
 $\Delta P_C$=controlled piece of process; and
 $\Delta P_{NC}$=uncontrolled piece of process.

Figure 7:
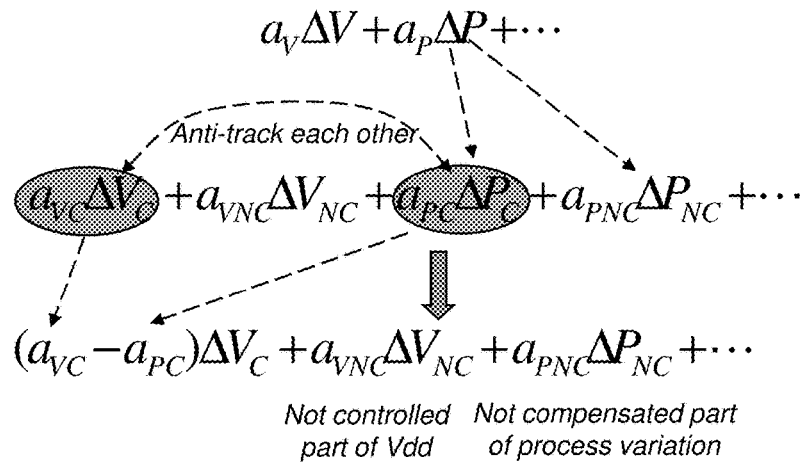
FIGS. 7 and 8 are exemplary techniques for performing processes in accordance with aspects of the invention.

In accordance with aspects of the present invention, the controlled piece of voltage and the controlled piece of process may then be anti-correlated or tracked as shown in FIG. 7 and formula (16).

$$(a_{VC} - a_{PC})\Delta V_C + a_{VNC}\Delta V_{NC} + a_{PNC}\Delta P_{NC} + \quad (16)$$

where: the controlled piece of voltage ($\Delta V_C$) is anti-correlated to the controlled piece of process such that $\Delta V_C = -\Delta P_C$;
 $a_{VNC}\Delta VN_C$=sensitivity to the uncontrolled piece of voltage; and
 $a_{PNC}\Delta P_{NC}$=sensitivity to the uncontrolled piece of process.

In embodiments, process variable or parameter splitting may be avoided by detailed analysis of voltage assignment for binned chips as shown in formulas (16)-(18).

$$f_{PSRO} = f_0 + \Delta f_C + \Delta f_P + f_U = f_0 + \Delta f_C + f_P\Delta P + \Delta f_U \quad (16)$$

where:
 $f_{PSRO}$=PSRO frequency, which is an indicator of process variation;
 $f_0$=mean of frequency;
 $\Delta f_C$=predictable variation of PSRO frequency (e.g., variation due to temperature, metal, etc.);
 $\Delta f_P = f_P\Delta P$=variation of PSRO frequency due to process variation; and
 $\Delta f_P$=independent variation of PSRO frequency, which is error (e.g., error due to OCV, random, etc.) that cannot be separated from effects of process variation.

Accordingly, an estimate measured PSRO frequency variation due to process variation may be expressed as shown in formula (17).

$$\Delta f_{PSRO} = f_{PSRO} - f_0 - \Delta f_C = f_P\Delta P + \Delta f_U \quad (17)$$

The voltage variability or process may be set according to the measured frequency variation as shown in formula (18).

$$V = V_0 + \alpha\Delta f_{PSRO} + \Delta V_{CE} = V_0 = \alpha f_P\Delta P + a\Delta f_U + \Delta V_{CE} = V_0 + k\Delta P + \Delta V_{NC} \quad (18)$$

where:
 $V_0$=nominal voltage;
 $a\Delta f_{PSRO}$=controlled part;
 $\Delta V_{CE}$=error of voltage control;
 $af_P\Delta P + a\Delta f_U$=error due to independent PSRO frequency variation;
 $k\Delta P$=process adjustment by anti-tracking; and
 $\Delta V_{NC}$=uncontrolled and wrongly controlled part.

As should be understood, formulas (16)-(18) provide a technique whereby variation is split into two parts or pieces (e.g., a controlled part used for process variation adjustment by anti-tracking, and an uncontrolled and wrongly controlled part due to error of process variation estimation). Additionally, this technique does not require the splitting of process variation into multiple parts or pieces.

Figure 8:
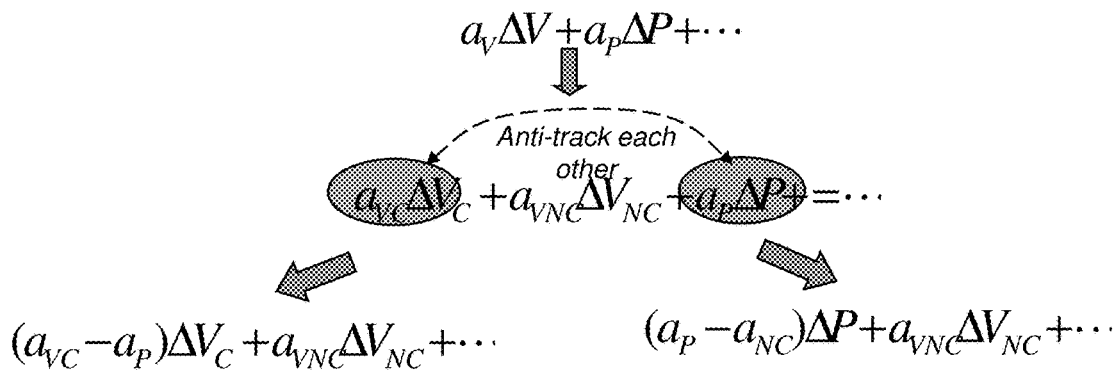

In additional or alternative aspects of the present invention, SVB may be implemented with partially controlled voltage and measurement error of process variation as shown in formulas (19) and (20) and FIG. 8. In formula (19), voltage is split into the two parts or pieces as discussed herein in detail to achieve a controlled part for compensating for process variation and an uncontrolled part of voltage variation.

$$\Delta V = \Delta V_C + \Delta V_{NC}. \quad (19)$$

In embodiments, sensitivities to parts of voltage variation may be computed to take into account their normalization. Additionally, part of the voltage variation may be anti-correlated or tracked to compensate for process narration as shown in formula (20).

$$(a_{VC}-a_P)\Delta V_C + a_{VNC}\Delta V_{NC} + \ldots (a_P-a_{NC})\Delta P + a_{VNC}\Delta V_{NC} + \quad (20)$$

At step 420, the worst slack from among the four projected corners of the process space (e.g., the trapezoid or parallelogram region) may be computed. For example the process may comprise computing the slack using the parameter projection at each of the four projected corners. After the four slack projections are computed, then the worst slack could be reported as the minimum slack across the four projection computations.

Although aspects of the present invention are discussed herein with respect to one pair of correlated parameters, it should be understood that any number or combination of parameters may be used without departing from the spirit and scope of the present invention. Furthermore, it should be understood that the embodiments described herein may be implemented with respect to single timing runs, multiple timing runs, SVB or any type of process binning in which there are existing problems with imperfect modeling control of a first parameter and imperfect sensing of a second parameter variation, and any other runs where partial parameters may be needed for improved modeling control.

Advantageously, the additional or alternative embodiments of the present invention allow for improved accuracy by modeling deterministic variation of at least one parameter and their effect on other sources of variation or parameters. Specifically, the additional and alternative systems and methods replace statistical models of parameter variations with deterministic models of parameter variations and model the cross terms with their effect on process binning. More advantageously, aspects of the present invention may allow for higher flexibility and capability to be adapted to different binning schemes and improves runtime, memory, and accuracy by modeling deterministic variations of a first parameter and its effect on other sources of variation (e.g., a second parameter).

Figure 9:
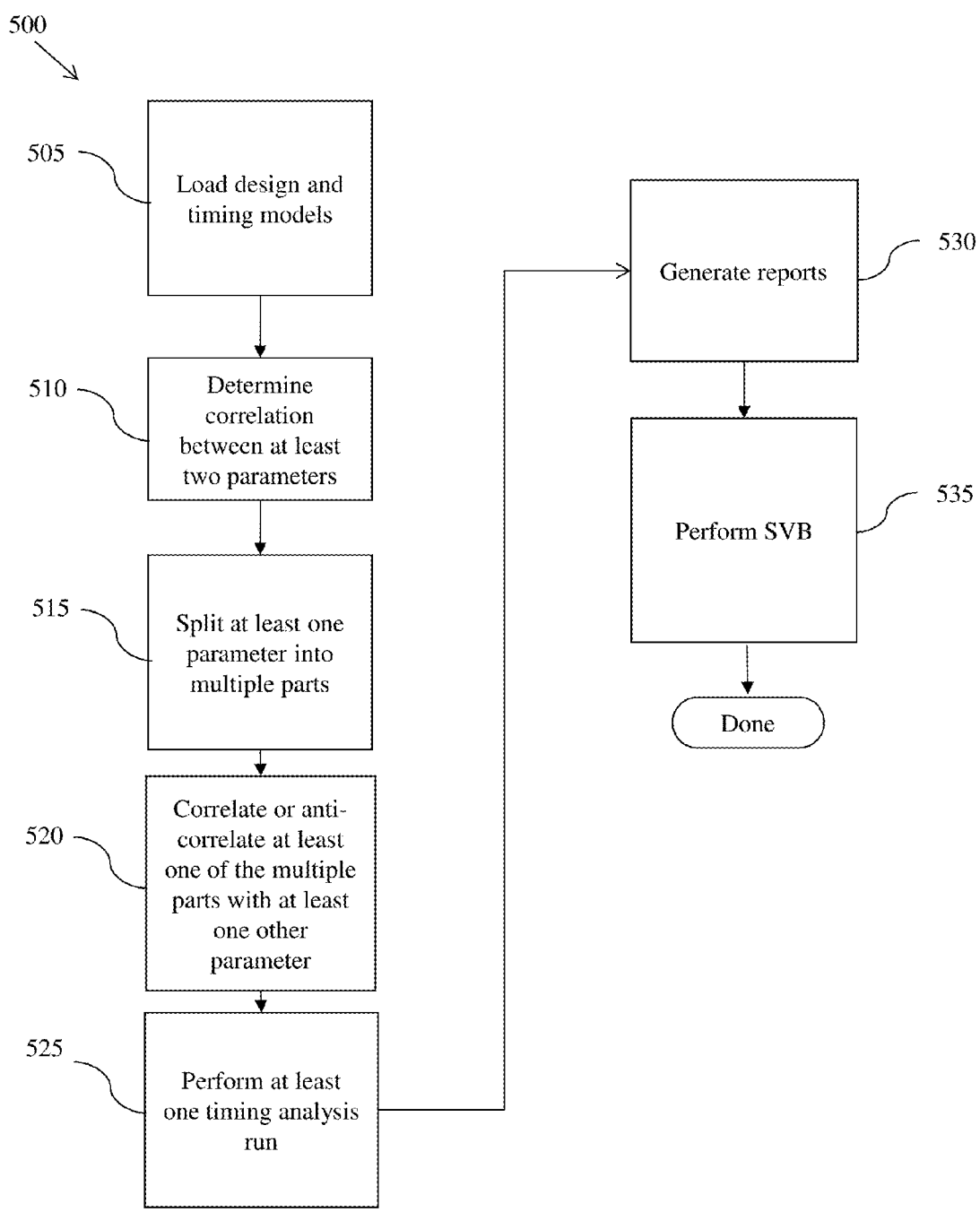
FIG. 9 is an illustrative process flow for implementing the system in accordance with aspects of the invention.

FIG. 9 depicts an exemplary flow for a process in accordance with aspects of the present invention. In embodiments, a process 500 is provided for closing timing of a semiconductor product by using parameters and partial parameters for OCV and voltage (i.e., a correlated pair of parameters), and the subsequent SVB of the semiconductor product. In accordance with aspects of the invention, the system and method of SSTA process 500 for performing statistical timing to model process variation of the integrated circuit or specified testing regions of the integrated circuit may use the techniques described in detail with respect to FIGS. 6-8.

At step 505, design and timing models for an integrated circuit or specified testing region of the integrated circuit may be loaded into a computing device. For example, a design structure and timing models for an integrated circuit or specified region of the integrated circuit may be loaded into computation tool 150 (as discussed with regard to FIG. 3).

At step 510, a correlation between at least two parameters may be determined or specified. For example, a user or the computation tool 150 may determine or specify a correlation or anti-correlation between at least two parameters of the integrated circuit. In embodiments, the correlation or anti-correlation may be determined by the computation tool 150 looking up correlations or anti-correlations based on the design structure. For example, the correlation or anti-correlation may be determined or specified by: (1) the physics of the devices in the design structure, (2) the manufacturing process of the design structure, or (3) the design structure architecture, such as, the implementation of voltage and temperature regulators that are designed to regulate the integrated circuit based on a defined relationship.

At step 515, at least one parameter of the at least two parameters with a determined correlation may be split into two or more parts or pieces. For example, voltage may be split into a correlated or controlled piece and an uncorrelated or uncontrolled piece. Optionally, another parameter, such as process may also be split into a correlated or controlled piece and an uncorrelated or uncontrolled piece.

At step 520, the correlated or controlled piece of the at least one parameter may be correlated or anti-correlated with the another parameter. For example, the correlated or controlled piece of voltage may be anti-correlated with the process parameter or optionally the controlled portion of the process parameter, and the uncontrolled piece of voltage may be treated as independent or its own separate variable.

At step 525, at least one timing run (e.g., a single SSTA) may be performed for the design structure that propagates the correlated or anti-correlated at least two parameters into the timing analysis. For example, an SSTA for the integrated circuit may be performed that computes a statistical approximation of the circuit timing characteristics, e.g., ATs, RATs, delay, and timing slack, as functions of the same parameters. Specifically, canonical delays may be calculated and then propagated to obtain ATS, RATs, and timing slack that take into consideration the at least two parameters separately. The general calculating of the SSTA for the design structure would be known to one of ordinary skill in the art such that further explanation is not required.

At step 530, reports may be generated. For example, the computation tool 150 may generate reports comprising any timing quantity including the RATs, the ATs, the slack projection, and the transition time or slew rate for the design structure obtained from the SSTA. The generated reports can then be used to place the integrated chip into the correct bin of a multi-bin SVB process at step 535.

Figure 10:
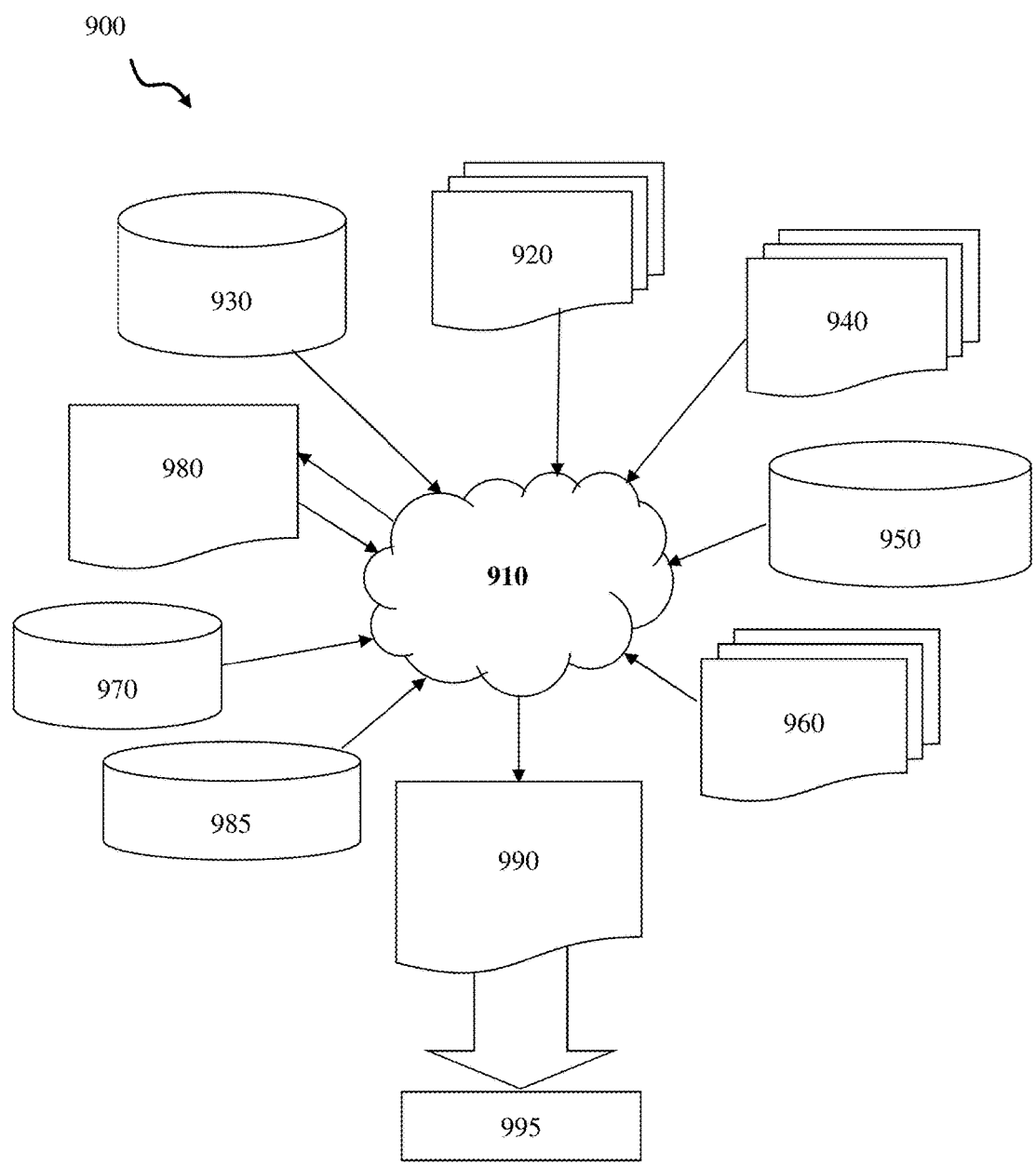
FIG. 10 is a flow diagram of a design process used in semiconductor design, manufacture, and/or test.

FIG. 10 is a flow diagram of a design process used in semiconductor design, manufacture, and/or test used with the system and method of the present invention. FIG. 10 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 that may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving a semiconductor product implemented in a computer infrastructure having computer executable code tangibly embodied on a non-transitory computer readable storage medium having programming instructions operable to:
    propagate at least one timing analysis run for a design of a semiconductor product;
    identify at least one parameter used in the at least one timing analysis run;
    split the at least one parameter into two parts comprising a deterministic part and a statistical part;
    correlate or anti-correlate the deterministic part with another parameter used in the at least one timing analysis run;
    project timing using the correlation or anti-correlation between the deterministic part and the another parameter and using the statistical part of the at least one parameter, wherein:
        the projecting of the timing comprises projecting a timing quantity computed in the at least one timing analysis run to minimum or maximum values of a range for the at least one parameter; and
        the projecting the timing quantity to the maximum value of the range includes identifying a parameter space shape of a projected process space for the design of the semiconductor product;
    set a parameter value for the maximum values based on the parameter space shape being identified as a trapezoid;
    close timing of the design of the semiconductor product using the projected timing; and
    instantiate the design of the semiconductor product into a programmable array.

2. The method of claim 1, wherein the projecting the timing comprises generating an extended canonical model comprising sensitivities of the at least one parameter and the another parameter.

3. The method of claim 1, wherein:
    the projecting the timing quantity to the minimum value of the range includes the splitting the at least one parameter into the two parts.

4. The method of claim 1, wherein the parameter space shape is identified as a parallelogram, and the projecting the timing quantity to the minimum value of the range includes the splitting the at least one parameter into the two parts.

5. The method of claim 1, wherein the programming instructions are further operable to take a root sum of square of the sensitivities of the at least one parameter and the another parameter.

6. The method of claim 5, wherein the programming instructions are further operable to calculate a worst slack from among four projected corners of a process space for the semiconductor product.

7. A method for improving a semiconductor product comprising:
    identifying at least two parameters used in at least one timing analysis run of a design of a semiconductor product;
    splitting at least one parameter of the two parameter into two parts comprising a deterministic part and a statistical part;
    correlating or anti-correlating the deterministic part with another parameter of the two parameters for each delay or slew calculated in the at least one timing analysis; and
    computing arrival times, required arrival times, and slack in the at least one timing analysis using the correlation or anti-correlation between the deterministic part and the another parameter and using the statistical part of the at least one parameter;
    projecting a timing quantity computed in the at least one timing analysis to minimum or maximum values of a range for the at least one parameter, wherein the projecting the timing quantity to the maximum value of the range includes identifying a parameter space shape of a projected process space for the design of the semiconductor product;
    setting a parameter value for the maximum values based on the parameter space shape being identified as a trapezoid;
    closing timing of the design of the semiconductor product using the timing analysis; and
    instantiating the design of the semiconductor product into a programmable array.

8. The method of claim 7, further comprising calculating a worst slack from among four projected corners of a process space for the semiconductor product.

9. The method of claim 8, further comprising splitting the another parameter into two parts comprising a deterministic part and a statistical part.

10. The method of claim 9, wherein the correlating or anti-correlating comprises correlating or anti-correlating the deterministic part of the at least one parameter with the deterministic part of the another parameter.

11. The method of claim 10, wherein the computing the arrival times, the required arrival times, and the slack comprises using the correlation or anti-correlation between the deterministic part of the at least one parameter and the deterministic part of the another parameter and using the statistical part of the at least one parameter and the statistical part of the another parameter.

12. The method of claim 11, wherein the at least one parameter is voltage and the another parameter is process.

13. A computer program product comprising a non-transitory computer readable storage medium having program instructions embodied therewith, the program instructions executable by at least one processor to cause the at least one processor to:
    propagate at least one timing analysis run for a design of a semiconductor product;
    identify at least one parameter used in the at least one timing analysis run;
    split the at least one parameter into two parts comprising a deterministic part and a statistical part;

correlate or anti-correlate the deterministic part with another parameter used in the at least one timing analysis run;

project timing using the correlation or anti-correlation between the deterministic part and the another parameter and using the statistical part of the at least one parameter, wherein:

the projecting of the timing comprises projecting a timing quantity computed in the at least one timing analysis run to minimum or maximum values of a range for the at least one parameter; and the projecting the timing quantity to the maximum value of the range includes identifying a parameter space shape of a projected process space for the design of the semiconductor product;

set a parameter value for the maximum values based on the parameter space shape being identified as a trapezoid; and close timing of the design of the semiconductor product using the projected timing, wherein the closing the timing of the design of the semiconductor product further comprises generating a new extended canonical model comprising the sensitivity to the first parameter and the sensitivity to the second parameter; and instantiate the design of the semiconductor product into a programmable array.

14. The computer program product of claim 13, wherein the projecting of the timing comprises projecting slacks computed in the at least one timing analysis run to minimum or maximum values of a range for the at least one parameter.

15. The computer program product of claim 14, wherein the at least one processor is further operable to take a root sum of square of the sensitivities of the at least one parameter and the another parameter.

16. The computer program product of claim 15, wherein the at least one processor is further operable to calculate a worst slack from among four projected corners of a process space for the semiconductor product.

17. The computer program product of claim 16, wherein the process space is one of a trapezoid and a parallelogram.

18. The method of claim 8, wherein the process space is one of a trapezoid and a parallelogram.

* * * * *